(12) United States Patent
Tremblay

(10) Patent No.: US 8,077,180 B1
(45) Date of Patent: Dec. 13, 2011

(54) SYSTEMS FOR AND METHODS OF USING A DISPLAY CONTROLLER TO OUTPUT DATA

(75) Inventor: Yves Tremblay, Point-Clarie (CA)

(73) Assignee: Matrox Graphics, Inc., Quebec (CA)

( * ) Notice: Subject to any disclaimer, the term of this patent is extended or adjusted under 35 U.S.C. 154(b) by 1025 days.

(21) Appl. No.: 11/962,685

(22) Filed: Dec. 21, 2007

(51) Int. Cl.
*G06F 3/038* (2006.01)
*G06F 15/00* (2006.01)
*G09G 5/00* (2006.01)
*G06T 1/00* (2006.01)

(52) U.S. Cl. .................................. 345/501; 345/204

(58) Field of Classification Search .................. None
See application file for complete search history.

(56) References Cited

U.S. PATENT DOCUMENTS

| | | | |
|---|---|---|---|
| 6,914,606 B2 | 7/2005 | Amemiya et al. | |
| 7,289,125 B2 * | 10/2007 | Diard et al. | 345/501 |
| 7,522,167 B1 * | 4/2009 | Diard et al. | 345/502 |
| 7,545,380 B1 * | 6/2009 | Diard et al. | 345/505 |

* cited by examiner

*Primary Examiner* — Kee M Tung
*Assistant Examiner* — Carlos Perromat
(74) *Attorney, Agent, or Firm* — Lando & Anastasi, LLP

(57) ABSTRACT

In accordance with one aspect, a display controller is included in a graphics processing unit. In some embodiments, the display controller includes a read memory requester configured to provide a data request to a source of image data, a data path configured to be coupled to the source of image data, an output coupled to the data path and a control unit in electrical communication with the read memory requester and the data path. In accordance with one embodiment, the output is configured to provide image data processed by the display controller and the control unit is configured to stop an output of image data processed by the display controller. In accordance with a further embodiment, the control unit includes a stop-output register configured to provide information employed by the control unit to stop the output of image data processed by the display controller.

32 Claims, 6 Drawing Sheets

SYSTEMS FOR AND METHODS OF USING A DISPLAY CONTROLLER TO OUTPUT DATA

BACKGROUND OF INVENTION

1. Field of Invention

Embodiments of the invention generally relate to graphics systems, and in particular to display controllers employed in graphics processing systems.

2. Discussion of Related Art

Display controllers are often used in computer systems to output 2D or 3D images to a display monitor. In general, the display controller is included in graphics processing systems.

FIG. 1, illustrates an example of a system 10 including a set 11 of processing units 1, 2 . . . N, a memory unit 12 and a graphics processing system 13 used to generate images for display on a display device 14 (e.g., screen, display, monitor, etc.). The system 10 may also include a bus 15 that interconnects various elements of the system 10. The graphics processing system 13 may receive instructions from an application running on at least one of the processing units 11 to generate a virtual image or to process graphics or video data for display on the display device 14. The graphics processing system 13 may be used to display images on more than one display device and each of the devices may be of different types (TV, wall, monitor, etc). In some embodiments, one or more of the display devices may be included in a video processing system. In a version of these embodiments, the video processing system may include a video recorder and/or monitor. In some embodiments, the processing units 11 may include a host processor (commonly referred to as a CPU). System 10 may also include dedicated processing units such as a video editing processor and/or an image processing unit among the set of processing units 11.

As illustrated in FIG. 1, a graphics processing system 13 may include an interface 21, a graphics processor 22, a frame buffer 23, a display controller 24 and an output port 25. The frame buffer may be external to the graphics processing system 13. The frame buffer 23 may store instructions and data sent by an application running on one of the plurality of processing units 11. Further the frame buffer may store the processed data while it is being processed in the graphics processor or once its processing is completed. In general, the interface 21 is used to connect the graphics processing system 13 to the processing units 11 and the memory 12 through the bus 15. The graphics processor 22 may receive data and instructions through the interface 21. Once processed, data is stored in the frame buffer 23 and is output by the display controller 24 to the display device 14. The display controller 24 may be configured by a driver to output data from the frame buffer 23 through the output port 25 according to the monitor's parameters (e.g., device resolution, refresh rate, etc.). These parameters may be defined at an initialization step, when the system 10 is switched on, or they may be defined by a user at any moment during the system's run time.

In general, display controllers run in a continuous mode and generate data at a preset refresh rate. The refresh rate is the rate at which the display monitor may display data. The refresh rate may be either automatically set by the system 10 according to the monitor's characteristics, or according to parameters defined by the user. A variety of methods, known in the art, may be used to set up the refresh rate and to allow the user to define a refresh rate corresponding to the display monitor connected to the system and the desired display resolution.

Although graphics processing systems are customarily designed to display images on a monitor, current computer systems may use a graphics processing system to perform a variety of tasks. Video editing or image processing are examples of applications for which a standard graphics processor may be used. As an example, a graphics processing system may be used in combination with a video editing system to mix 3D graphics characters to a video scene.

Traditional approaches in which the display controller operates in a continuous mode were sufficient for historical uses of display controllers but are not suitable for some current applications. For example, the incorporation of a 3D character in a movie scene should be synchronized to other sources and mixed to a video stream when the video editing application requests it. These requirements are often incompatible with a continuous output of data, e.g., at a constant refresh rate.

Accordingly, some prior approaches have attempted to output processed data from a graphics processing system upon receipt of an output request. In one approach, the interface 21 is used. In this approach, an application sends data to be processed by the graphics processing system via the interface 21. The application also receives the processed data from the system via the interface 21. That is, data returns through the interface 21. This approach however, uses a lot of bandwidth on the bus 15 which connects the graphics processing system to the external processors. Further, this approach may prevent the graphics processing system from processing new data while it is outputting data through the interface. As a result, the graphics processing system operates inefficiently because it is employed outputting data during periods when it might otherwise be processing data.

In another approach a continuous stream of data is communicated from the output port of the graphics processing system to the application at a predetermined refresh rate. The application then extracts relevant data from the data-stream. For example, a dedicated hardware module may receive the data in a continuous mode and store and transfer the data to the processor requesting it at a different rate or frame-by-frame upon request. However, such an approach requires the addition of the dedicated hardware module in addition to the display controller and other components of the graphics processing system.

Currently, display controllers are often equipped with a control unit such as a cathode ray tube controller ("CRTC"). The control unit may contain various counters that are used to control the output of an image and to generate the timing signals that the display devices require. One example of a signal generated by the control unit is the horizontal synchronization signal ("hsync"). In one embodiment, the hsync signal indicates to the display device that it should move its displaying position to the next line. Another example is the vertical synchronization signal ("vsync"). In one embodiment, the vsync signal is used to indicate to the display device that it should move its displaying position to the first line. In general, the control unit employs horizontal and vertical counters that can increment periodically and compares the values of the counters to one or more registers to know when to restart at zero for a new frame and when to toggle the state of different control signals.

The control unit may generate a plurality of signals that are used to control the display of data. FIG. 2 illustrates an example of an embodiment of a control unit that may generate one of these signals, e.g., the hsync signal. The control unit includes a horizontal signal counter 46 which is associated with the generation of the hsync signal.

The horizontal signal counter 46 increments at each clock cycle in accordance with the illustrated embodiment. In the illustrated embodiment, the control unit also includes a plurality of horizontal registers 47A-47C, for example, the registers hsyncstr (i.e., horizontal synchronization start) and hsyncend (i.e., horizontal synchronization end). In accordance with one embodiment, the control unit includes a plurality of comparators 48A-48C that are employed to perform a comparison between the value in one or more of the plurality of horizontal registers and the value of the horizontal signal counter 46. The horizontal registers 47A-47C each contain a separate value that is compared to the value of the horizontal signal counter 46, for example, at each clock cycle. In accordance with one embodiment, each time the value in the hsyncstr register 47A equals the value of the horizontal signal counter 46, the signal hsync is activated. Further, each time the value in the hsyncend register equals the value of the horizontal signal counter 46 the signal hsync is deactivated. The example provided by FIG. 2 illustrates the generation of one control signal employed by the display device, i.e., the horizontal sync signal for the generation of the horizontal pixels (e.g., lines) of an image. Typically, the control unit generates additional control signals associated with the illustrated counters and may include additional counters associated with the generation of the additional control signals, for example, a vertical counter.

Further, the control unit may include a preload register 49 that is employed to initialize the horizontal signal counter at a desired value. As illustrated in FIG. 2, the horizontal signal counter 46 may receive the trigger signal (e.g., a video reset signal, "vidrst") which is employed to trigger an upload of the value of the preload register 49 to the horizontal signal counter 46.

In a further embodiment, the control unit may include an htotal register 47C among the horizontal registers. In the illustrated embodiment, comparator 48C is employed to compare the value of the htotal register 47C with the horizontal counter 46. In one embodiment, the horizontal counter 46 is reset to a starting value (for example, zero) when the output of the comparator 48C supplies a restart signal to the horizontal counter 46 as a result of the comparison of the value of the htotal register 47C and the horizontal counter 46.

Thus, a traditional graphics processing system including a traditional display controller generally operates to process and output a frame of image data in response to a request for the graphics processing system to process the data. Further, this data continues to be output until the graphics processing system receives a subsequent request.

SUMMARY OF INVENTION

In contrast to prior approaches, embodiments of the invention configure and employ graphics processing systems and display controllers to process a frame of image data in response to a request. In some embodiments, however, the display controller does not output the processed data until it receives a signal to output the data. That is, in some embodiments, two separate signals are employed to initiate: 1) processing of the frame; 2) outputting of the processed frame, respectively. Accordingly, in some embodiments, the timing of the two signals is controlled to more precisely coordinate an output of the graphics processing system with the needs of an application. Further, some embodiments of the invention provide methods and systems to output data on-demand from a graphics processing system. Accordingly, various embodiments may operate to output image data from a display controller as needed by a processing unit. Further, some embodiments of the invention allow an output of image data from the graphics processing system where the output is synchronized to the requirements of an application running on a processing unit. In various embodiments, the output of a display controller may be controlled such that the output is of less than a full frame of image data. Thus, some embodiments can be employed to provide a pre-determined quantity of data to an application at a specific moment or moments.

In accordance with one aspect, a display controller is included in a graphics processing unit. In some embodiments, the display controller includes a read memory requester configured to provide a data request to a source of image data, a data path configured to be coupled to the source of image data, an output coupled to the data path and a control unit in electrical communication with the read memory requester and the data path. In accordance with one embodiment, the output is configured to provide image data processed by the display controller and the control unit is configured to stop an output of image data processed by the display controller. In accordance with a further embodiment, the control unit includes a stop-output register configured to provide information employed by the control unit to stop the output of image data processed by the display controller.

In accordance with another aspect, the invention provides a method of controlling an output of a display controller included in a graphics processing unit. In some embodiments, the method includes acts of storing information at the display controller that identifies a stopping-point corresponding to an output of a predetermined quantity of image data by the display controller; requesting image data for processing and subsequent output by the display controller; and stopping the output of image data by the display controller when the information that identifies the stopping-point corresponds to a value generated at the display controller.

In accordance with yet another aspect, the invention provides a method of controlling an output of a graphics processing unit where the method includes an act of receiving a request to process and output a predetermined quantity of image data, processing and outputting the predetermined quantity of image data and stopping the output of image data when the predetermined quantity of processed image data is output. In accordance with some embodiments, the method includes an act of stopping the output of the image data before a complete frame is output by the graphics processing unit.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 6A-6B illustrate data output from a display controller in accordance with an embodiment of the invention.

DETAILED DESCRIPTION

Figure 1:
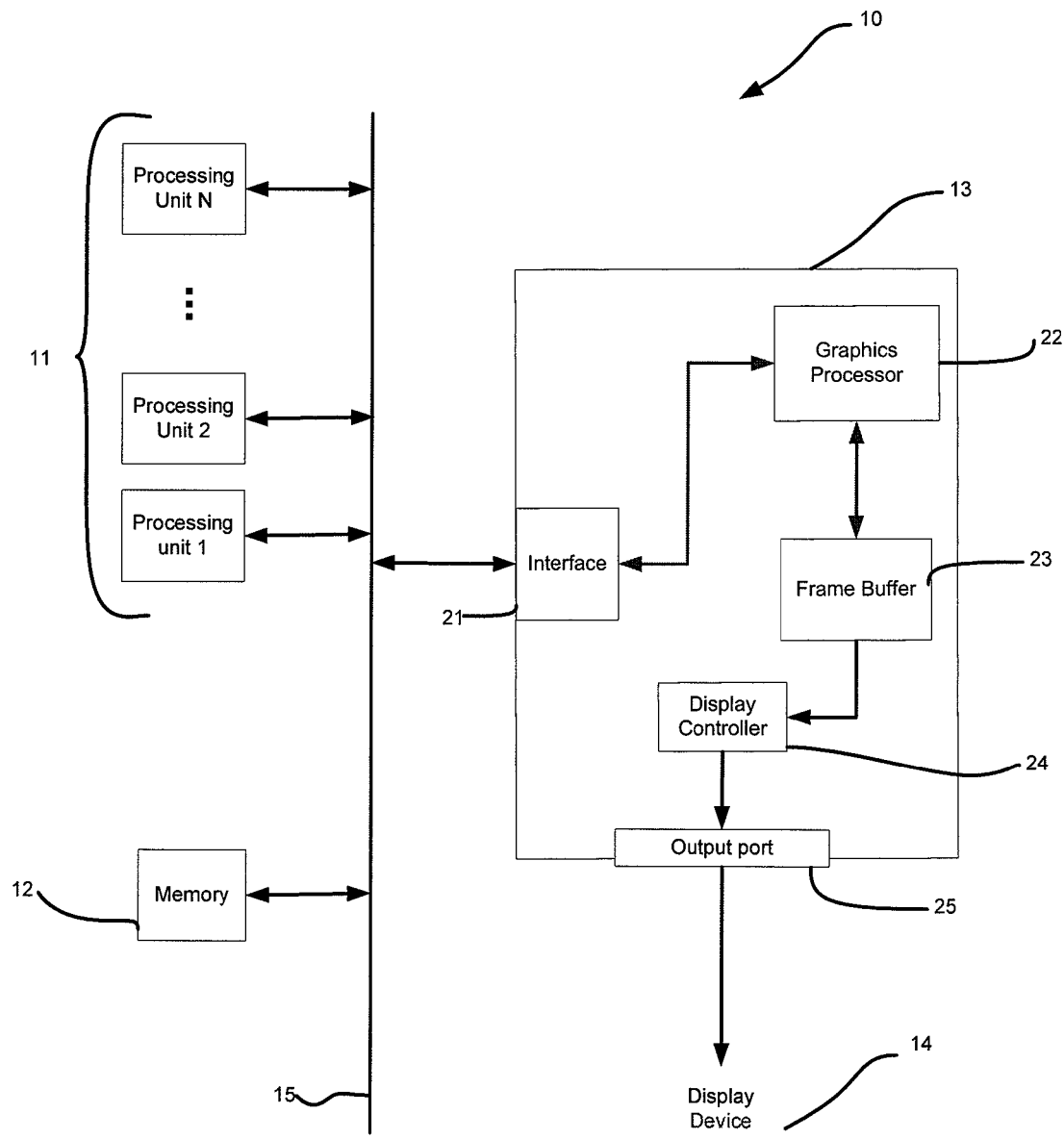
FIG. 1 illustrates a system including a graphics processing system.
Figure 2:
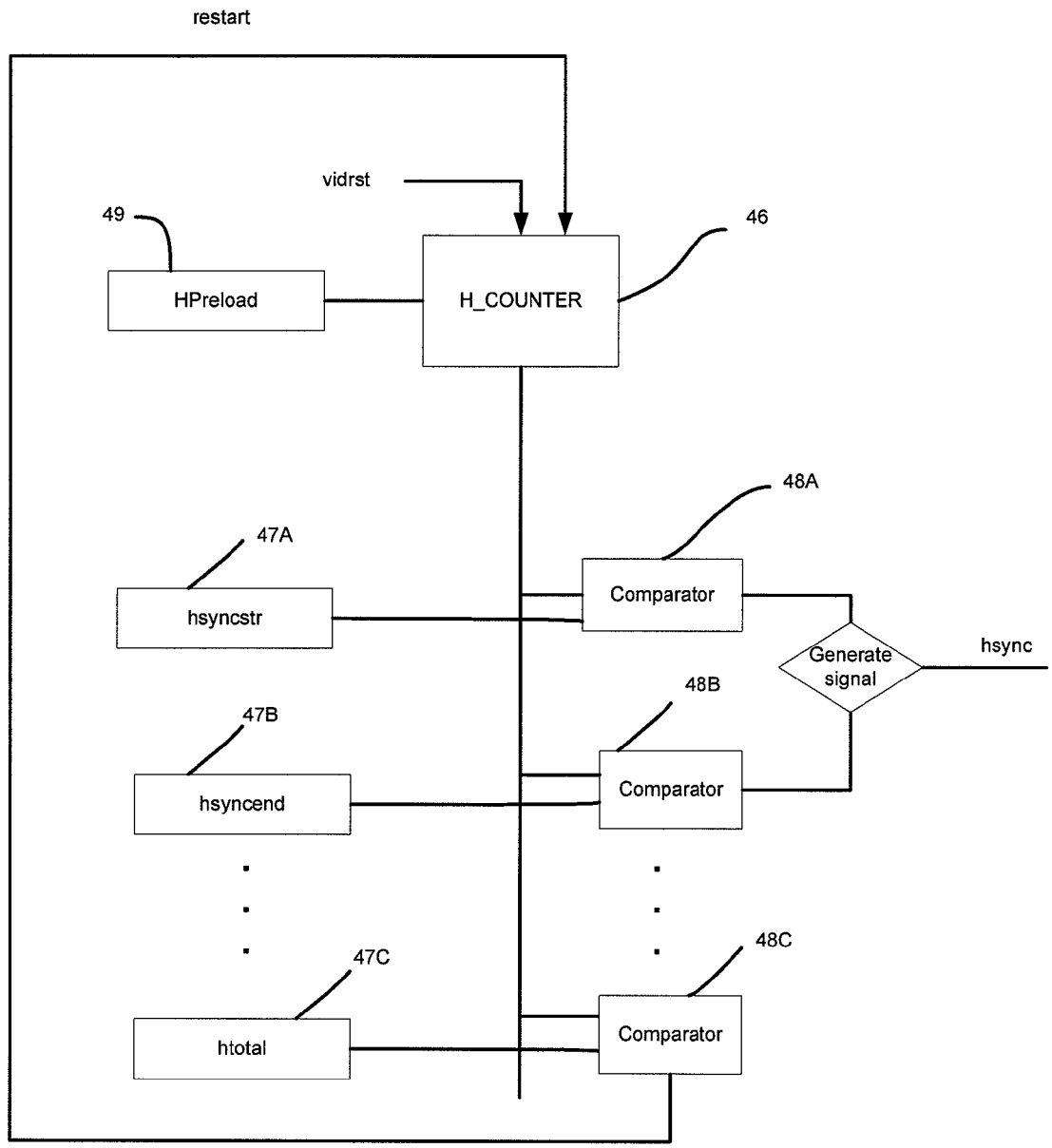
FIG. 2 illustrates elements of a prior art control unit.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Figure 3:
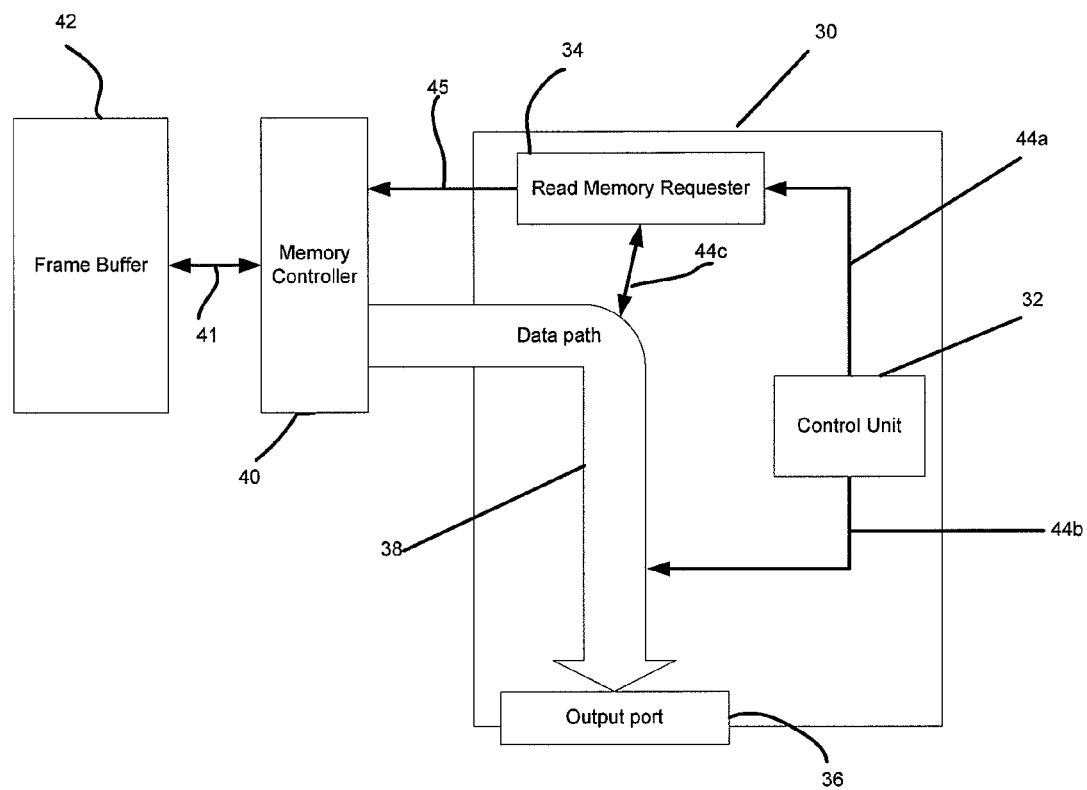
FIG. 3 illustrates a display controller in accordance with an embodiment of the invention.

Referring now to FIG. 3, a display controller 30 is illustrated in accordance with one embodiment. In accordance with the illustrated embodiment, the display controller 30 includes a control unit 32, a read memory requester 34, an output port 36 and a data path 38. In one embodiment, the display controller 30 is employed in a graphics processing system. In the illustrated embodiment, the display controller 30 is connected to a frame buffer 42 through a memory controller 40. Further, various communication paths 44 are included within the display controller 30, for example, a first communication path 44A between the control unit 32 and the read memory requester 34, a second communication path 44B between the control unit 32 and one or more elements included in the data path 38 and a third communication path 44C between the read memory requester 34 and one or more elements of the data path 38. As illustrated, an additional communication link 45 connects the read memory requester 34 to the frame buffer 42. Further, a communication link 41 connects the memory controller to the frame buffer 42. According to some embodiments, the communication link 41 provides for bi-directional communication between the memory controller 40 and the frame buffer 42.

In some embodiments, the communication path 44 includes one or a plurality of communication busses. Further, the communication paths 44 and may be a bi-directional communication path in one or more embodiments. While in other embodiments, one or more portions of the communication path 44 are uni-directional. The communication paths 44 and 45 may communicate instructions, commands, handshake signals and/or requests. Further, the communication link 41 may communicate instructions, commands, requests and/or data.

In various embodiments, the data path 38 may include FIFOs and other hardware elements, software elements or a combination of one or more hardware and software elements that are employed by the display controller 30 to process image data.

According to one embodiment, the frame buffer 42 stores image data, for example, one or more complete frames of data for display. In a version of this embodiment, the image data includes information concerning the color value of pixels that make up an image. The frame buffer 42 may be included in a local memory while in an alternate embodiment the frame buffer is included in a system memory. In general, image data is received from the frame buffer 42 through the memory controller 40 and undergoes one or more steps of processing (e.g., a processing sequence) before being output at the output port 36.

In general, the display controller 30 operates to request data from a frame buffer 42 to format the data for display on a display device (e.g., a monitor, a TV, a display wall, etc.) or to be received by a processing system, for example, a video processing system, an image processing system, etc. The formatted data is provided at an output port 36. In accordance with one embodiment, the general operation includes the generation of control signals such that the formatted data is output by the display controller 30 at a predetermined refresh rate and resolution. For example, the control unit 32 generates a plurality of signals (hsynch, vsynch, hblank, vblank, etc.) that are used by the display controller 30 to synchronize and set up the data in the proper format for display.

In addition, in accordance with various embodiments, the control unit 32 operates to control the output of data by the display controller 30 such that the data is provided either at a continuous refresh frame rate or on-demand. In one embodiment, when operating in an on-demand mode the control unit 32 operates to control the output of the display controller 30 such that a predetermined quantity of data is provided at the output port 36 in response to an output request from an internal or external source. As one example, an application running on the host (or another external processor) instructs the graphics processing system (e.g., the display controller 30) to process and output a single frame of data (one image) and then to stop outputting data. In some embodiments, the display controller can be programmed with the predetermined quantity of data. The predetermined quantity of data may not include an entire frame of data and may be all or a part of a frame of data.

In accordance with various embodiments, an operating mode of the control unit 32 may be adjusted such that the control unit 32 (and the associated display controller 30) may be switched between the on-demand operating mode and the continuous operating mode. In one embodiment, the display controller 30 operates in a continuous-mode in which the read memory requester 34 requests image data from the memory controller 40 via the communication link 45, and image data is read from the from the frame buffer 42 by the memory controller 40 and transferred to the display controller 30 before being output at the output port 36. For example, in one embodiment, the control unit 32 communicates a signal to the read-memory requester to start requesting image data. When operating in the continuous mode, the display controller 30 continuously outputs data at the output port, for example, at a constant refresh rate (e.g., frame rate) as specified for the application. Accordingly, the display controller 30 also operates to continuously receive image data from the frame buffer.

In accordance with one embodiment, when operating in the on-demand mode the display controller is configured to output a predetermined quantity of data upon receipt of an output request. The output request may be provided to the display controller 30 from a graphics processor, a host system or an external processor. In accordance with one embodiment, the external processor is included in a video editing system/and or application. In accordance with another embodiment, the external processor is included in an image processing system.

In general, the display controller 30 requests data from the frame buffer 42 through the memory controller 40, processes the data and outputs the processed data through the output port 36 in a format suitable for display with a display device. In various embodiments, the processing of the image data by the display controller 30 may include post-processing in the data path 38. For example, prior to being formatted for display the image data may be stored in the frame buffer 42 as an array of pixels that may require further processing by the display controller 30. In accordance with one embodiment, the read memory requester 34 communicates a data request via the communication link 45 to the memory controller 40 for selected image data. The pixels corresponding to the image data are then communicated from the frame buffer 42 (e.g., read from the frame buffer) and may be post-processed in the data path. One example of post-processing includes a gamma correction of the data received from the frame buffer, e.g., gamma compression, gamma decompression, etc. In addition, various other types of processing known to those of ordinary skill in the art may be performed on the data by the display controller 30, e.g., color space conversion, dithering, etc. In general, the control unit 32 synchronizes the output at a predetermined refresh frame rate and resolution. That is the control unit 32 generates a plurality of signals (e.g., hsynch, vsynch, hblank, vblank, etc.) that synchronize and set up the image data in the proper format for display. In accordance with one embodiment, the control unit 32 is a cathode ray tube controller ("CRTC").

Figure 4:
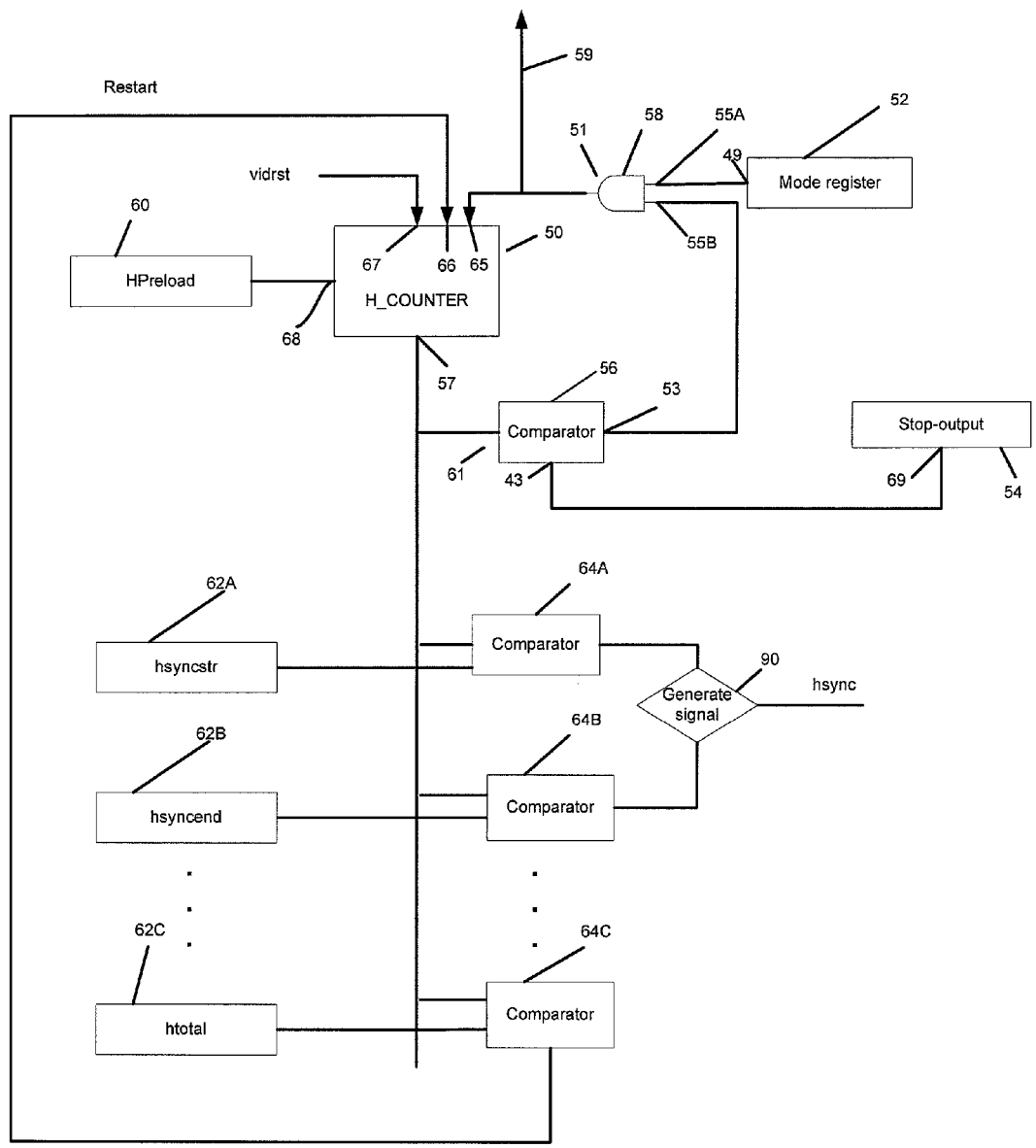
FIG. 4 illustrates elements of a control unit employed in a display controller in accordance with an embodiment of the invention.

Referring now to FIG. 4, details of the control unit 32 of FIG. 3 are illustrated in accordance with one embodiment. In accordance with the illustrated embodiment, the control unit includes a counter 50, a mode register 52, a stop-output register 54, a comparator 56, a logic element 58, a pre-load register 60, and a plurality of registers 62A-62C. Each of the preceding elements may include hardware, software or a combination of hardware and software. Further, the logic element 58 may include any one or a combination of a plurality of logic gates that are well known to those of ordinary skill in the art, e.g., AND, OR, NAND, NOR, etc.

In accordance with a further embodiment, the controller also includes a plurality of comparators 64A-64C where each of the plurality of comparators 64A-64C is associated with a corresponding one of the registers 62A-62C. According to one embodiment, each of the plurality of comparators 64A-64C includes one or more logic elements. In addition, the control unit 32 may also include a signal generator 90 coupled to one or more of the comparators 64A-64C. In the illustrated embodiment, the signal generator 90 is employed to generate a hsync signal based on an output received from one or more of the plurality of comparators 64A-64C. For example, the signal generator 90 may generate the hsync signal when any one of the plurality of comparators (e.g., 64A, 64B, etc.) indicates that a corresponding one of the plurality of registers 62A, 62B has a value that equals the value of the counter 50. In one embodiment, the signal generator 90 includes one or more logic elements. In various embodiments either or both of the plurality of comparators 64A-64C and the signal generator 90 include hardware, software or a combination of hardware and software.

According to one embodiment, the counter 50 includes a first input 65, a second input 66, a third input 67, a fourth input 68, an output 57. In one embodiment, the logic element 58 includes a first input 55A, a second input 55B, and an output 51. Further, in one embodiment, the mode register 52 includes an output 49 that is connected to the first input 55A of the logic element 58. In a further embodiment the comparator 56 includes an input 61 connected to the output 57 of a counter 50, and an output 53 connected to a second input 55B of the logic element 58. Further, in one embodiment, the output 51 of the logic element 58 is connected to the first input 65 of the counter 50. Further, the comparator 56 may include a second input 43. In a further embodiment, the stop-output register 54 includes an output 69 connected to the second input 43 of the comparator 56.

In accordance with one embodiment, the fourth input 68 of the counter 50 is connected to the preload register 60. In a further embodiment, the third input 67 of the counter 50 is connected to a source of a trigger signal that can be employed to load the value of the counter 50 with the value included in the preload register 60. In still another embodiment, the second input 66 of the counter 50 is connected to a source of a restart signal that can be employed to restart the counter at a known value, for example, at zero.

In accordance with some embodiments the output 57 of the counter 50 is connected to an input of each of the plurality of the comparators 64A-64C. In a further embodiment, an output of each of the registers 62A-62C, is connected to a corresponding one of the plurality of comparators 64A-64C. In the illustrated embodiment, an output of one or more of the plurality of comparators 64A-64C, is connected to a signal generator 90 employed in this example to generate the hsync signal.

In accordance with one embodiment at least one of the registers 62A-62C is connected to a comparator, for example, the comparator 64C that includes an output connected to the second input 66 of the counter 50. That is, to provide a signal to trigger a restart of the counter 50 at a selected value, for example, the initial starting value of the counter 50.

In accordance with one embodiment, in operation in the continuous mode, the value of a counter 50 is initialized with a value supplied from the pre-load register 60 to a fourth input 68 of the counter 50. The value of the counter 50 is compared with the value of the individual signal generation registers 62A-62C. For example, the hsyncstr register 62A may have a value that is compared by a first comparator 64A with the value of the counter 50. In one embodiment, the signal generator 90 generates a signal when those values are equal, i.e., generates the hsync signal. As a further example, a comparison is performed between a hsyncend register 62B and the value in the counter 50 using a second comparator 64B where a signal is generated by the signal generator 90 based on the results of a comparison of these two values. In the illustrated embodiment, the counter 50 is associated with the horizontal lines in an image. In this embodiment, the counter 50 may count the number of pixels in each line such that it is incremented once each clock cycle and is then reset to zero each time the end of a line is reached. In a version of this embodiment, the horizontal counter may count both visible pixels and the width of the blank area of a line.

As illustrated in FIG. 4, a htotal register 62C may be employed to restart the counter at a selected value, e.g., at an initial value. According to one embodiment, the size of a frame to be displayed when operating in a continuous mode may be established at least in part by the value in the htotal register 62C. That is, the value of the htotal register 62C may represent the end of a horizontal line. According to one embodiment, the comparator 64C is employed to determine when the value of the htotal register 62C equals the value of the counter 50 such that a restart signal is supplied from the comparator 64C to the counter 50 at the second input 66. In accordance with one embodiment, the restart signal is a logic signal that is communicated to the second input 66 of the counter 50. According to various embodiments, the counter 50 may restart at zero or another value other than zero when the end of a line is reached.

Further, in some embodiments, the third input 67 can receive a reset signal (e.g., video reset or "vidrst"). In these embodiments, the value of the counter 50 may be reset to a preload value which is supplied at the fourth input 68 from the preload register 60 when the reset signal is received at the third input 67. In some embodiments, the display controller begins outputting data when the counter 50 is initialized in response to a receipt of a signal (e.g., the video reset signal) at the third input 67. That is, the reset signal received at the third input 67 may initiate an output of data by the display controller. In some embodiments, the display controller may output a plurality of blank pixels before outputting data when the counter 50 is initialized in response to a receipt of a signal (e.g., the video reset signal) at the third input 67.

Further, a control unit may operate in a genlocked mode in which the counters (e.g., the counter 50, etc.) are aligned with the counters of other control units for the purpose of having a plurality of independent display controllers output data in phase with one another. In this embodiment, when the trigger signal is received, the value of the preload register 49 may be immediately uploaded to the counter which starts incrementing from that value in synchronism with the other control units that are operating in the genlocked mode. In accordance with one embodiment, a trigger signal is sent by a master controller to other controllers that are to be operated in a genlocked mode and the in-phase operation is obtained by providing each with a trigger signal simultaneously. When operated in this mode, the controllers should have the same parameters and frame rates in order to remain in-phase during the continuous generation of output frames by the display controller. In accordance with some embodiments, a small amount of phase shift may be acceptable because the master controller can be configured to regularly send the trigger signal in order to allow the separate controllers to be relocked in synchronized operation without any noticeable effect on the display of the image. In accordance with one embodiment, when operating in a continuous mode a video reset signal is used to place the control unit in the genlocked mode.

In some embodiments, a stopping point is employed when the control unit is operating in the on-demand mode. In various embodiments, the stopping point can be identified by the display controller and/or an external application. For example, the external application can supply information concerning the stopping point to the display controller 30 and the control unit 32 can program one or more registers accordingly. The display controller 30 and/or control unit 32 can also be programmed to establish the operating mode that they are to operate in, e.g., the continuous mode or the on-demand mode. In various embodiments, the stopping point identifies a pre-determined amount of image data to be output by display controller after which the display controller may stop outputting data. In accordance with some embodiments, the mode register 52 is programmed with a value that indicates whether the control unit (and the corresponding display controller) is operating in the on-demand mode. In accordance with further embodiments, the stopping point may be identified at least in part by a value programmed in the stop-output register 54 is programmed with the point at which the display controller has output the pre-determined amount of image data. According to one embodiment, a processor external to the display controller provides a stopping point that corresponds to the output of a pre-determined amount of image data by the display controller. The stopping point can be established at least in part by the value of the stop-output register 54 at the control unit.

In accordance with one embodiment, when operating the on-demand mode, the stop output register 54 is programmed with a value associated with an end of an output of processed image data from the display controller. In some embodiments, the value of the stop-output register 54 is compared with the value of the counter 50 by the comparator 56. In accordance with one embodiment, a logic signal is supplied to the output 53 of the comparator 56 to indicate when the value of the stop-output register 54 equals the value of the counter 50. For example, a HI logic state may be provided at the output of the comparator 56 when the two values are equal. In some embodiments, an output is generated at the output 51 of the logic element 58 where the value of the mode register 52 indicates that the display controller is operating in the on-demand mode and the output 53 of the comparator 56 indicates that the predetermined quantity of data has been output. For example, a HI logic signal may be generated at the output 51 of the logic element 58 when the preceding conditions occur.

In various embodiments, the output 51 of the logic element 58 may be employed to stop the output of data by the display controller. In accordance with one embodiment, a value of the counter 50 is periodically incremented (for example, at each clock cycle). In accordance with one embodiment, the output generated at the output 51 of the logic element 58 may be employed to stop the counter 50 from further incrementing and may be sent to at least one of the components included in the data path through the communication link 59 to stop the output of data. In some embodiments, the output generated at the output 51 of the logic element 58 may be employed to set the status of the output of the display controller on hold. According to another embodiment, as described above, the display controller continues to output data so long corresponding control signals are generated, e.g., hsync, vsync, etc. In some embodiments, the counter 50 stops incrementing upon receipt of a signal from the logic element 58 at the first input 65. Accordingly, the display controller may stop outputting data because no further control signals are generated by the control unit, for example, no further hsync signals are generated, when the value of counter 50 is static.

Figure 5:
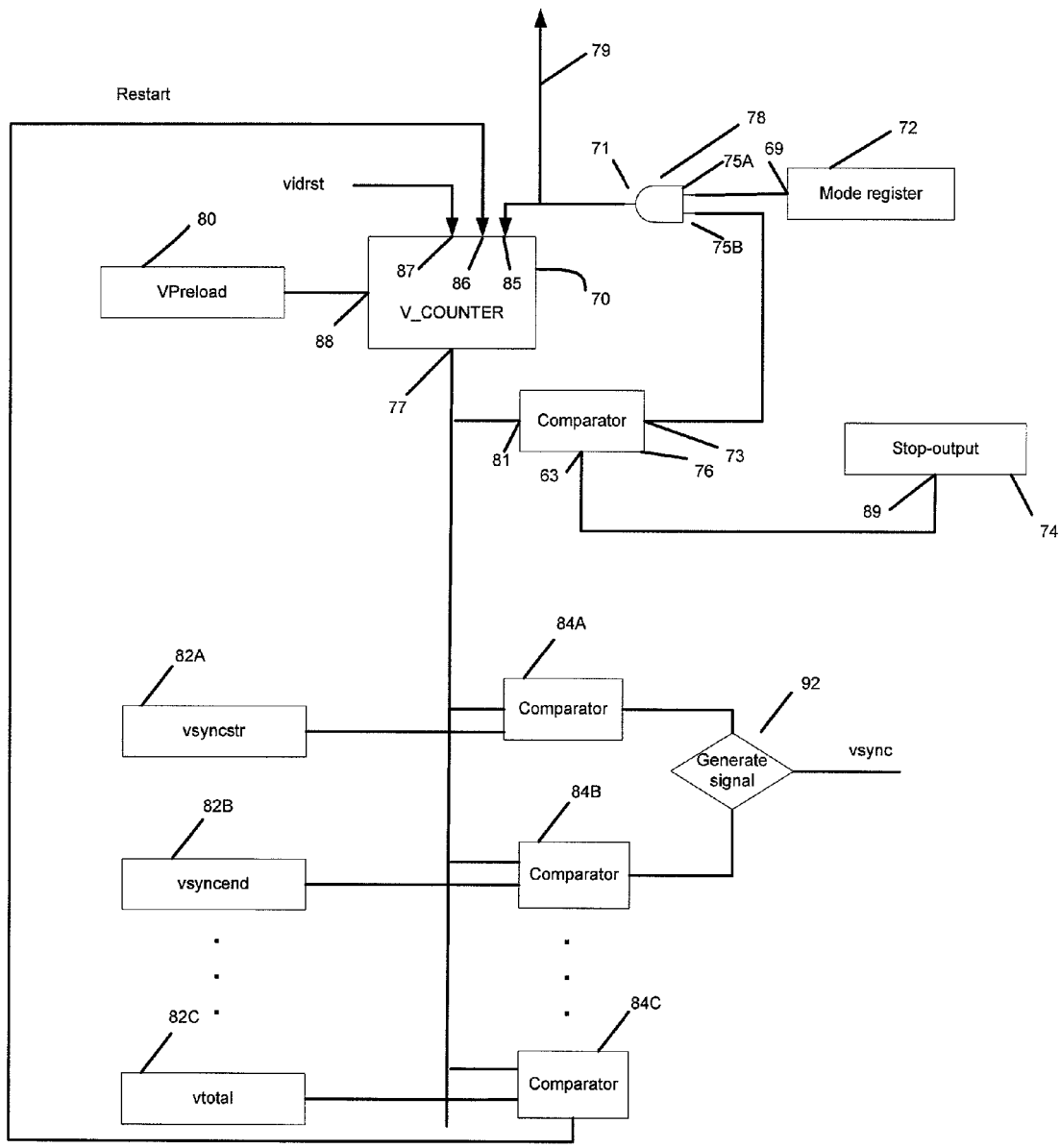
FIG. 5 illustrates further elements of a control unit employed in a display controller in accordance with another embodiment of the invention.

In addition, embodiments may include one or more additional counters associated with a generation of other control signals. That is, in some embodiments, the control unit (e.g., the control unit 32) may include the counter 50 which is associated with generation of the hsync signal and other counters associated with the generation of different control signals. Referring now to FIG. 5, in accordance with one embodiment, the control unit includes a counter 70 that is associated with a generation of signals concerning the scanning of an image from top to bottom. The counter 70 is incremented to indicate the number of lines that a frame may contain. For example, the counter 70 may be employed to indicate the number of visible lines and the number of lines in the blank area of the frame. In accordance with the illustrated embodiment, the control unit includes a mode register 72, a stop output register 74, a comparator 76, a logic element 78, a preload register 80, a plurality of registers 82A-82C, and a plurality of comparators 84A-84C. For example, a first comparator 84A may be associated with a vsyncstr register, a second comparator 84B may be associated with a vsyncend register, and a third comparator 84C may be associated with a vtotal register. Each of the preceding elements may include hardware, software or a combination of hardware and software. Further, the logic element 58 may include any one or a combination of a plurality of logic gates that are well known to those of ordinary skill in the art, e.g., AND, OR, NAND, NOR, etc.

According to one embodiment, the counter 70 includes a first input 85, a second input 86, a third input 87, a fourth input 88, and an output 77. In one embodiment, the logic element 78 includes a first input 75A, a second input 75B, and an output 71. Further, in one embodiment, the mode register 72 includes an output 69 that is connected to the first input 75A of the logic element 78. In a further embodiment, the comparator 76 includes an input 81 connected to the output 77 of a counter 70, and an output 73 connected to a second input 75B of the logic element 78. Further, in one embodiment, the output 71 of the logic element 78 is connected to the first input 85 of the counter 70. Further, the comparator 76 may include a second input 63. In a further embodiment, the stop-output register 74 includes an output 89 connected to the second input 63 of the comparator 76.

According to one embodiment, each of the plurality of comparators 84A-84C includes one or more logic elements. In addition, the control unit 32 may also include a signal generator 92 coupled to one or more of the comparators 84A-84C. In the illustrated embodiment, the signal generator 92 is employed to generate a vsync signal based on an output received from one or more of the plurality of comparators 94A-94C. For example, the signal generator 92 may generate the vsync signal when any one of the plurality of comparators (e.g., comparators 94A, 94B, etc.) indicates that a corresponding one of the plurality of registers (e.g., registers 92A, 92B) has a value that equals the value of the counter 50. In one embodiment, the signal generator 92 includes one or more logic elements. In various embodiments either or both of the plurality of comparators 94A-94C and the signal generator 92 include hardware, software or a combination of hardware and software.

In accordance with one embodiment, the fourth input 88 of the counter 70 is connected to the preload register 80. In a further embodiment, the third input 87 of the counter 70 is connected to a source of a trigger signal that can be employed to reset the value of the counter 70 to the value included in the preload register 80. In still another embodiment, the second input 86 of the counter 70 is connected to a source of a restart signal that can be employed to restart the counter at a known value, for example, at zero.

In accordance with some embodiments the output 77 of the counter 70 is connected to an input of each of the plurality of the comparators 84A-84C. In a further embodiment, an output of each of the registers 82A-82C, is connected to a corresponding one of the plurality of comparators 84A-84C. In the illustrated embodiment, an output of one or more of the plurality of comparators 84A-84C, is connected to a signal generator 92 employed in this example to generate the vsync signal.

In accordance with one embodiment at least one of the registers 82A-82C is connected to a comparator, for example, the comparator 84C that includes an output connected to the second input 86 of the counter 70. That is, to provide a signal to trigger a restart of the counter 70 at a selected value, for example, the initial starting value of the counter 70.

In accordance with one embodiment, in operation in the continuous mode, the value of a counter 70 is initialized with a value supplied from the pre-load register 80 to the fourth input 88 of the counter 70. The value of the counter 70 is compared with the value of the individual signal generation registers 82A-82C. For example, the vsyncstr register may have a value that is compared by a first comparator 84A with the value of the counter 70. In one embodiment, the signal generator 92 generates a signal when those values are equal, i.e., generates the vsync signal. As a further example, a comparison is performed between a vsyncend register and the value in the counter 50 using a second comparator 84B. In various embodiments, a signal is generated by the signal generator 92 when the values are determined to meet pre-determined criteria relative to one another, for example, when the values are equal.

In accordance with one embodiment, the counter 70 may be incremented each time it receives a signal from the counter 50 associated with the generation of horizontal lines. As illustrated in FIG. 5, one of the plurality of register 82C (e.g., vtotal) may be employed to restart the counter at zero. In this embodiment, the comparator 84C is employed to determine when a full frame is output based on a comparison between the value of the counter 70 and the value of the register 82C. In various embodiments, the value of the counter 70 is reset each time a full frame is output. In accordance with one embodiment, the value of the counter 70 equals the value of the register 82C when a full frame is output. In accordance with one embodiment, the restart signal is a logic signal that is communicated to the second input 86 of the counter. In another embodiment, the counter 70 may restart at a value other than zero.

Further, in some embodiments, the third input 87 can receive a reset signal (e.g., vidrst). In these embodiments, the value of the counter 70 may be reset to a preload value which is supplied at the fourth input 88 from the preload register 80 when the reset signal is received at the third input 87. In some embodiments, the display controller may begin outputting data when the counter 70 is initialized in response to a receipt of a signal (e.g., the video reset signal) at the third input 87. The signal supplied to the third input 87 may be a signal common to a plurality of counters that are initialized to allow the display controller to begin outputting data, for example, the signal that is supplied to the third input 87 may also be supplied to the third input 67 of the counter 50. Thus, in some embodiments, the signal may be used to initiate an output of data by the display controller. In some embodiments, the display controller may output a plurality of blank lines before outputting data when the counter 70 is initialized in response to a receipt of a signal (e.g., the video reset signal) at the third input 87.

In some embodiments, a stopping point is employed when the control unit is operating in the on-demand mode. In various embodiments, the stopping point can be identified by the display controller and/or an external application. In various embodiments, the stopping point identifies a pre-determined amount of image data to be output by display controller after which the display controller may stop outputting data. In accordance with some embodiments, the mode register 72 is programmed with a value that indicates whether the control unit (and the corresponding display controller) is operating in an on-demand mode. In accordance with further embodiments, the stop-output register 74 is programmed with a value that indicates the stopping point, e.g., the point at which the display controller has output the pre-determined amount of image data. According to one embodiment, a processor external to the display controller provides a stopping point that corresponds to the output of a pre-determined amount of image data by the display controller. The value of the stop-output register 74 can be established to identify the stopping point at the control unit based on the stopping point provided by the external processor. Further, the stopping point may result in less than a full frame of data being output by the display controller.

In accordance with one embodiment, when operating in the on-demand mode, the stop output register 74 is programmed with a value associated with an end of an output of processed image data from the display controller. In some embodiments, the value of the stop-output register 74 is compared with the value of the counter 70 by the comparator 76. In accordance with one embodiment, a logic signal is generated at the output 73 of the comparator 76 based on the comparison between the value of the stop-output register 74 and the value of the counter 70. For example, a HI logic state may be provided at the output 73 of the comparator 76 when the two values are equal. In some embodiments, an output is generated at the output 71 of the logic element 78 where the value of the mode register 72 indicates that the display controller is operating in the on-demand mode and the output 73 of the comparator 76 indicates that the predetermined quantity of data has been output. For example, a HI logic signal may be generated at the output 71 of the logic element 78 when the preceding conditions occur.

In various embodiments, the output 71 of the logic element 78 may be employed to stop the output of data by the display controller. In accordance with one embodiment, a value of the counter 70 is incremented, for example, upon receipt of a signal from the counter 50, receipt of a clock signal, etc. According to some embodiments, the display controller continues to output data so long corresponding control signals are generated, e.g., hsync, vsync, etc. In some embodiments, the counter 70 stops incrementing upon receipt of a signal from the logic element 78 at the first input 85. Accordingly, the display controller may stop outputting data because no further control signals are generated by the control unit, for example, no further vsync signals are generated, when the value of counter 70 is static.

In accordance with some embodiment, when operating in the on-demand mode, the output 51 of the logic element 58 (FIG. 4) and the output 71 of the logic element 78 (FIG. 5) may be employed to stop the output of data by the display controller. That is, the display controller may stop the output of data based on the output of either or both of the logic elements 58 and 78 or the outputs of either or both of the logic elements 58 and 78 in combination with outputs of one or more additional logic elements that may be associated with the generation of other control signals by the control unit.

As described above, the display controller continues to output data so long as corresponding control signals are generated, e.g., hsync, vsync, etc. In some embodiments, the counter 70 stops incrementing upon receipt of a signal from the output 71 of the logic element 78 at the first input 85. In accordance with one embodiment, the output generated at the output 71 of the logic element 78 is sent to the logic element 58 and may be employed to stop the increment of the counter 50. According to this embodiment, an output may be generated at the output 51 upon receipt of a signal from the comparator 56 (e.g. when the value of counter 50 is equal to the value of the stop-output register 54) and a signal from the logic element 78 and this output may be employed to stop the increment of the counter 50 and to stop the output of data by the display controller. According to some embodiments the mode register 72 and the mode register 52, included in the control unit, are a unique register which may be connected to logic element 58 through input 55A and connected to logic element 78 through input 75A.

In accordance with some embodiments, the display controller may be configured to operate in an on-demand mode. According to one embodiment, the control unit may not include the stop-output register 54, the mode register 52, the comparator 56 and the logic element 58. Accordingly the display controller may be configured to output a determined quantity of image data by configuring the stop-output register 74 and the mode register 72 and the output of data may be initiated upon receipt of a vidrst (video reset) signal through input 87 from an external processor.

In accordance with some embodiments, the display controller may be configured to output a predetermined quantity of image data where the stop-output register 74 may be configured with a value that indicates the number of lines that the processed data may contain and the stop-output register 54 may be configured with a value that indicates the number of pixels that the last line of data may contain.

In accordance with some embodiments, an application may request the processing of a frame in the graphics processor and the output from the display controller of a first quantity of data that is a subset of this frame. According to this embodiment, the control unit may be configured to output the first quantity of data and hold the output of the remaining data of the frame. In accordance with one embodiment, the display controller is configured to output the first quantity of image data by configuring the mode registers 52, 72, the stop output registers 54 and 74, the hpreload register 60 and the vpreload register 80 with appropriate values. Further the display controller may be configured to output a second quantity of data of the same frame, such that the hpreload register 60 and the vpreload register 80 includes the previous values of the stop-output register 54 and the stop-output register 74 (i.e. the values associated with the output the first quantity of data) and the stop output registers 54 and 74 includes new values indicative of the second quantity of data to be output. Upon receipt of an initialization signal (e.g., a video reset signal) the display controller outputs the second quantity of data.

Figure 6B:
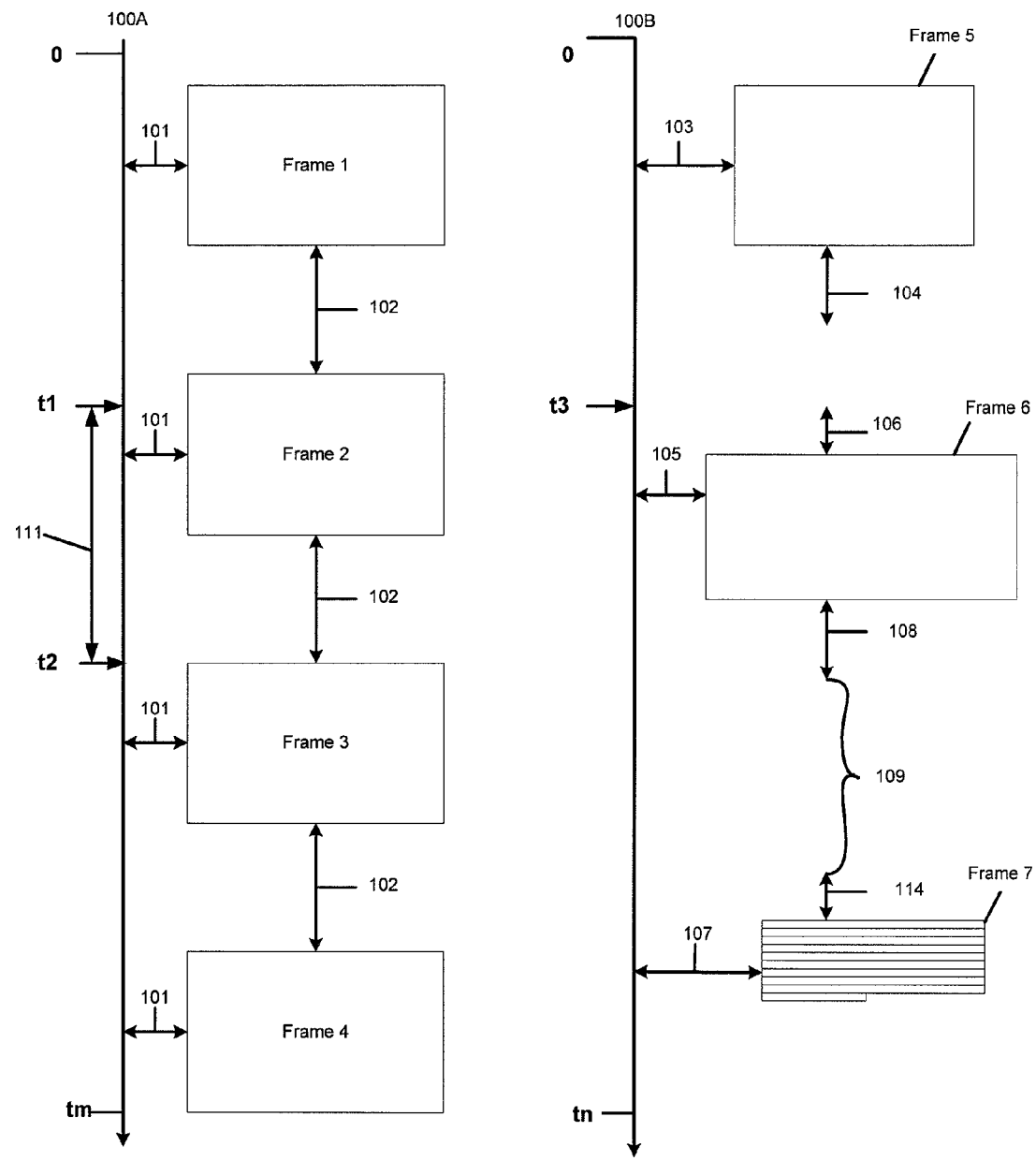

Referring now to FIGS. 6A-6B, in accordance with some embodiments, the display controller and the control unit may be configured to operate in a continuous mode or in an on-demand mode. FIG. 6A illustrates a first time-line 100A concerning operation in the continuous mode and FIG. 6B illustrates a second time-line 100B concerning operation in the on-demand mode. A series of frames as output by the display controller are illustrated adjacent each time line.

In accordance with one embodiment, the display controller operates in a continuous mode and generates an output during a time interval from 0-tm where the output includes a series of frames: frame 1, frame 2, frame 3 and frame 4 as illustrated in FIG. 6A. According to this embodiment, the display controller is configured with constant hblank interval 101 and vblank interval 102 and each frame (i.e frame 1, frame 2, frame 3 and frame 4) contains the same quantity of data. The content of each frame (e.g., the image provided by each frame) may differ from frame to frame, or alternatively, each frame may include the same content.

In operation, in accordance with one embodiment, a processing unit (e.g., a processor external to the graphics processing system) requests that the graphics processing system process and send a frame of data to the processing unit. Accordingly, the frame 1 is output by the display controller and communicated to the processing unit after some delay following the request. The display controller then continuously outputs that frame of data until such time that the processing unit requests that another frame be processed and forwarded to the processing unit. Accordingly, the frames; frame 1, frame 2, frame 3 and frame 4 illustrated in FIG. 6A may all be the same frame of data that is output a number of consecutive times.

In a further operation according to the illustrated embodiment, the processing unit may, at time t1, request that the graphics processing system process and send a different frame of data. That is, frame 1 may provide a first image and the processing unit may request a frame including a second image. The graphics processing system may receive the request at approximately time t1. The display controller is already outputting frame 2 (which includes image 1) at the time of the request. Accordingly, there is a delay (a time span 111) between the time of the request (i.e., the time t1) and the time (i.e., the time t2) that the display controller outputs the requested frame, i.e., a frame that includes the second image, for example, frame 3. As illustrated in FIG. 6A, the display controller does not begin to output frame 3 until the time t2 which follows the time span 111 during which the processing unit must wait to receive the requested data. As described above, in the continuous mode, frame 4 (which includes the contents of frame 3) is output subsequent to frame 3 with the same hblank interval 101 and vblank interval 102.

In accordance with another embodiment, as illustrated in FIG. 6B, the display controller may operate in the on-demand mode and may output a plurality of different quantities of processed data upon receipt of a plurality of requests. In accordance with some embodiments, different quantities of processed data may be included in different frames, for example, the frames may be of different sizes. Further, in some embodiments, the quantity of processed data may be less than a full frame of data.

As an example in accordance with one embodiment, a first application may request the processing of frame 5 by the graphics processing system and the output of frame 5 with appropriate intervals for hblank 103 and vblank 104. Further, the same or a different application may request the processing of frame 6 that includes a different quantity of image data than frame 5. Accordingly, the display controller may be configured after the output of a frame 5 with different parameters (e.g., a different hblank, vblank, htotal, vtotal, etc.) and outputs frame 6 upon receipt of an output request from an external processor and/or application. Further a display controller operating in an on-demand mode, may output an incomplete frame as illustrated by frame 7 in FIG. 6B.

As illustrated in FIG. 6B, in various embodiments, each frame may be output by the display controller with values of the horizontal blanking and vertical blanking that differ from others of the frames that are output (depending upon the request, they may also be the same values for a plurality of frames). Accordingly, the horizontal blanking values identified by the reference characters 103, 105 and 107 may each be different, and the vertical blanking values identified by the reference characters 104, 106, 108 and 114 may also be different. In some embodiments, these values are established by the application for which the data is requested. Further, the values may be loaded into one or more stop-output registers (e.g., the stop-output registers 54, 74) to provide the display controller with information used to control the amount of data that is output by the display controller, for example, to output the amount of information requested by the application.

Thus, the on-demand mode may be employed to more precisely control an output of a display controller such that a pre-determined amount of data is output to meet the requirements of a process that is employing the data, for example, to provide a video editing system with the amount of data needed by the video editing system in real-time. Many such processes do not require a continuous supply of data. Accordingly, some embodiments of the systems described herein provide a display controller with a real-time output of data. That is, in accordance with some embodiments, the display controller is configured to provide one frame (or portion thereof) per request and to do so immediately upon receiving the request. In some embodiments, the display controller outputs the frame (or portion thereof) and then stops outputting data until receipt of a subsequent request. Such an approach may be advantageous when used in those applications that do not employ a continuous supply of data.

In addition to the preceding, in various embodiments, the display controller may output data in response to a request supplied to the graphics processing system (for example, by a processing unit) without the delay associated with operation in the continuous mode. Referring to FIG. 6B, for example, the display controller may stop outputting data following the output of frame 5. Subsequently, at the time t3, a request for the data corresponding to frame 6 may be received by the graphics processing system. Because the display controller is not outputting any data following the output of frame 5 it can quickly begin outputting frame 6. Accordingly, in some embodiments, the display controller is configured to immediately, or at least, substantially immediately output requested data upon a receipt of a request for the data by the graphics processing system, e.g., by the graphics processor.

In FIG. 6B, the time span 109 illustrates a time period in which the display controller and the associated control unit are stopped (e.g., not processing or outputting image data) and are awaiting a subsequent request to output additional data. It should be apparent to those of skill in the art that the display controller need not output a series of different frames, but may also output a series of the same frame in response to a series of requests from one or more processing units. In contrast to operation in the continuous mode, however, the individual frames that are output may be separated by time spans (e.g., the time span 109) in which the display controller is inactive and awaits a request to output another frame.

In accordance with some embodiments, operation of a display controller in the on-demand mode allows for a more rapid response to a request that requires the display controller output data with different parameters. That is, because data is not continuously output in the on-demand mode, the display controller may more rapidly switch from an output of data with a first refresh rate and/or first resolution to an output of data with a second refresh rate and/or second resolution because it may already be waiting for a revised set of output parameters. As mentioned above, the receipt of a signal (e.g., the receipt of the video reset signal), can in some embodiments, initiate an output of data by the display controller. In these embodiments, other signals (e.g., other than the video reset signal) may be employed to initiate an output of data provided they trigger a restart of the display controller to output data after the output had previously been stopped. According to some embodiments, when operating in an on-demand mode, the read memory requester is set up with the location of a requested frame and the display controller (which had been stopped) can begin outputting the requested frame upon receipt of the video reset signal. That is, according to some embodiments, in the on-demand mode the graphics processing system receives a first command or signal to process data and a second signal (e.g., the video reset signal) to output the processed data.

According to one embodiment, when operating in the continuous mode, the graphics processing system processes the data in response to a command from an application, for example, the data is processed by the graphics engine. The display controller then continuously processes and outputs the data processed by the graphics engine, e.g., a frame of data. Before the display controller can output the frame, however, the read memory requester is first set up with the address location of the data. Further, when operating in the continuous mode, the reinitialization of counters included in the control unit of the display controller may delay the start of the output by the display controller of the requested data under the new set of output parameters. Further, where the data for the new frame replaces the data for the preceding frame at the same address location, the continuous nature of the processing may result in the display controller outputting a frame that includes some data from each of the new frame and the previous frame.

In some embodiments, operation of a display controller in the on-demand mode allows for more efficient use of bandwidth at the memory controller. That is, when operating in an on-demand mode a display controller outputs only data that is required. Data may not be read from memory unless it is requested by an application or an external processor for output. Accordingly the memory controller may be fully utilized by the graphics processor to read or write data from or to memory while the display controller is stopped.

As will be recognized by those of skill in the art, other approaches for the generation of signals employed to control the output of data from a display control unit may be employed. In accordance with some embodiments, a single counter (e.g., the counter 50) is employed to generate a plurality of control signals for the control of an output of the display controller. That is, in one embodiment, the counter 50 can be employed to generate both the hsync signal and the vsync signal. For example, the plurality of comparators 64A-

64C may be connected to some of the output bits (i.e., the bits associated with the counter value at for example the output 57). In this embodiment, the plurality of comparators 84A-84C may be connected to others of the output bits of the counter 50. In this embodiment, the plurality of registers 62A-62C can be connected to the associated comparator 64A-64C, respectively, and the plurality of registers 82A-82C can be connected to the associated comparator 84A-84C. The signal generation provided by the signal generators 90, 92 can otherwise be performed as indicated in the preceding embodiments. Thus, a single counter may be employed to generate both vertical and horizontal control signals. In a further embodiment, a single counter may be employed to generate a plurality of the vertical and horizontal control signals.

In still a further embodiment, the control unit may contain a plurality of counters connected in cascade where each counter has a single function associated with the generation of the control signals for the output of horizontal lines of an image. That is, a first counter may be used to determine the quantity of pixels that are visible in a line. In one embodiment, the first counter is employed to trigger a second counter once the first counter completes its count, that is, the first counter reaches a predetermined value. In a further embodiment, the second counter is used for the horizontal "front porch", that is, the time between the end of the display and the beginning of the hsync signal. Further, once the second counter completes its count, the second counter may trigger a third counter that is used to count the hsync width. In some embodiments, additional counters may be cascaded in a similar fashion along with the first, second and third counters.

In one embodiment, each counter of the plurality of cascaded counters may have programmable values where each value provides the width of some image data in pixels. In accordance with one embodiment, these counters may be initialized at a programmed value and decremented to zero. In another embodiment, a counter can start at zero and increment until the programmed value is reached. A similar set of counters can be cascaded in accordance with this embodiment to generate the control signals for the vertical control. In one embodiment, each counter may stop once it reaches its end value until it receives a trigger from the upstream counter in the cascade before it begins counting again. That is, in accordance with one embodiment, the final counter in the chain in the cascade generates an output that triggers a restarting of the first counter in the chain, for example, by supplying a signal to the second input 66 of the counter 50. In addition, a separate set of cascaded counters can be employed for the generation of each of the horizontal control signals and the vertical control signals.

In yet another embodiment, the control unit may employ a single counter to count the width of each signal that is to be generated and to reset once it completes a count associated with a first of the signals before proceeding to a count associated with the immediately subsequent signal. This approach can be employed for a plurality of control signals, for example, where the control unit is programmed to identify the order in which the counter generates information concerning each of the respective control signals.

In accordance with one embodiment, the stopping point for processing/outputting data in the on-demand mode is established based on the size of the image that is to be output by the display controller. In accordance with one embodiment, the amount of data that is processed by the graphics processor and output to the monitor by the display controller may not be identical. That is, an application may request the processing of an entire frame by the graphics processor and request the output of a quantity of processed data which is determined by the values provided by each of the stop output register 54 and the stop output register 74. Accordingly, the display controller need not output an entire frame but can instead be configured to output only part of a frame. Therefore, the image that is supplied at the output of display controller may include less than an entire frame.

According to one or more embodiments, the stopping point may be identified in a variety of manners. According to one embodiment, the stopping-point may be based on a last portion of image data to be output by the display controller for a particular request. The last portion may, for example, be identified by a location in memory where the last portion of the image data is found. According to this embodiment, the display controller stops outputting data when the image data that is last in the processing sequence is output by the display controller. Alternatively, or in addition to the preceding, the stopping point may be established based upon a quantity of image data to be output by the display controller. According to one embodiment, when operating in an on-demand mode, the display controller receives a request for an output of image data where the request includes a starting point and a predetermined quantity of data to be output. In response, the display controller begins outputting data and continues to output data until, for example, the control unit determines that a quantity of data output by the display controller matches the predetermined quantity.

According to one or more embodiments, a request for operation in a selected one of the operating modes can be communicated to a graphics processing system including a display controller (e.g., the display controller 30) and a control unit (e.g., the control unit 32) in a variety of ways. In accordance with one embodiment, an application may send a request to a driver which will set up the mode registers 52 and 72 with an appropriate value indicating the selected operating mode, for example, the on-demand mode or the continuous mode.

The control unit 32 and the elements illustrated in each of FIGS. 5 and 6 can be implemented in a variety of hardware, software or combinations of the preceding. In accordance with one embodiment, logic circuitry is employed to provide the control unit 32. In some embodiments, the graphics processing system includes a graphics accelerator. In versions of these embodiments, the display controller is included in the graphics accelerator.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A display controller included in a graphics processing unit, the display controller configured to include a plurality of operating modes including at least an on-demand mode and a continuous mode,
    wherein the display controller is configured, when operating in the on-demand mode, to initiate the processing and output of a pre-determined quantity of data independent of a refresh rate, and stop an output of data when the display controller identifies that the predetermined quantity of data is processed and output.

2. The display controller of claim 1, comprising a cathode ray tube controller.

3. The display controller of claim 1, comprising a stop-output register configured to provide information employed by the display controller to stop the output of data processed by the display controller.

4. The display controller of claim 3, wherein the display controller comprises:
a counter configured to provide a counter-value employed to control the output of the data processed by the display controller; and
a comparator configured to perform a comparison of a value of the stop-output register and the counter-value,
wherein the display controller is configured to stop the output of data based on a result of the comparison.

5. The display controller of claim 4, wherein the display controller is configured to stop the data output when the value of the stop-output register and the counter-value are equal to one another.

6. The display controller of claim 4, wherein the counter is associated with a processing of horizontal lines of an image.

7. The display controller of claim 6, wherein the counter is a first counter,
wherein the stop-output register is a first stop-output register,
wherein the display controller includes a second counter associated with a processing of horizontal pixels and a second stop-output register, and
wherein the display controller is configured to stop the data output based on at least one of a comparison of a value of the second stop-output register and a value of the second counter and the comparison of the value of the first stop-output register and counter-value.

8. The display controller of claim 7, wherein the display controller is configured to stop the data output based on results of both the comparison of the value of the first stop-output register and counter-value and the comparison of the value of the second stop-output register and the value of the second counter.

9. The display controller of claim 7, wherein the display controller further includes a second comparator configured to perform the comparison of the value of the second stop-output register and the value of the second counter.

10. The display controller of claim 6, wherein the display controller further comprises at least one additional register,
wherein the at least one additional register is associated with the processing of horizontal pixels, and
wherein the at least one additional register is configured to provide a value that is employed by the display controller to generate a control signal to control a processing of data received by the display controller based on a comparison of the value of the at least one additional register and the value of the counter-value.

11. The display controller of claim 4, comprising a mode register in electrical communication with the counter, the mode register configured to provide information concerning whether the control unit is operating in the continuous mode or the on-demand mode.

12. The display controller of claim 1, wherein the display controller is configured to receive a request to process and output the pre-determined quantity of data.

13. The display controller of claim 12, wherein the display controller is configured to stop the data output only when the information provided by the mode register indicates that the display controller is operating in the on-demand mode.

14. The display controller of claim 12, wherein the display controller is configured to initiate processing and output of the predetermined quantity of data in response to the request provided to the display controller.

15. A method of controlling an output of a display controller included in a graphics processing unit, the method comprising acts of:
selecting an operating mode of the display controller from at least an on-demand mode and a continuous mode;
when the display controller is operating in the on-demand mode;
storing information at the display controller, during an initialization of the display controller, to identify a stopping-point corresponding to an output of a predetermined quantity of data by the display controller;
processing and outputting the pre-determined quantity of data by the display controller independent of a refresh rate; and
stopping the output of data by the display controller when the information that identifies the stopping-point corresponds to a value generated at the display controller.

16. The method of claim 15, further comprising an act of generating the value by updating a value of a counter at each clock cycle of the display controller.

17. The method of claim 15, further comprising an act of, when the display controller is operating in the continuous mode, operating without employing the stopping-point.

18. The method of claim 17, wherein the information that identifies the stopping point is a numerical value, wherein the act of stopping the output of data includes an act of determining whether the numerical value equals the value of the counter.

19. The method of claim 17, further comprising an act of placing the display controller in a selected operating mode by communicating a signal to the display controller in response to a request by a software application.

20. The method of claim 15, wherein the predetermined quantity of data corresponds to a frame of data, wherein the method further comprises an act of
waiting to receive a request for a second predetermined quantity of data by the display controller before outputting any additional data.

21. The method of claim 20, further comprising acts of:
receiving, by the display controller, an identification of a stopping point corresponding to the output of the second predetermined quantity of data, wherein the second predetermined quantity of data corresponds to a second frame of data; and
receiving, by the display controller, a request for processing and output of the second predetermined quantity of data.

22. The method of claim 21, wherein the request for processing and output of the second predetermined quantity of data is received from an external device and wherein the second predetermined quantity of data is communicated from the display controller to the external device.

23. The method of claim 22, further comprising an act of communicating a series of frames of data from the display controller to the external device in response to a plurality of discrete requests for one or more frames of the series received at the display controller.

24. The method of claim 22, further comprising an act of processing and outputting the series of frames of data to the external device in a synchronized manner relative to a processing of the data by the external device.

25. The display controller of claim 15, further comprising an act of receiving a request for processing and subsequent output of the pre-determined quantity of data by the display controller.

26. A method of controlling an output of a display controller, the method comprising acts of:

selecting an operating mode of the display controller from at least a continuous mode and an on-demand mode;

when the display controller is operating in the on-demand mode:

initializing the display controller with information that identifies when a predetermined quantity of data is processed and output by the display controller;

processing and outputting data with the display controller independent of a refresh rate; and stopping the output of the data when, with the information provided in the act of initializing, the display controller identifies that the predetermined quantity of data is processed and output.

27. The method of claim 26, further comprising an act of stopping the output of data before a complete frame is output by the display controller.

28. The method of claim 26, further comprising an act of selecting an operating mode of the display controller from at least the on-demand mode and a continuous mode in which data is constantly output by the graphics processing unit at a predefined rate.

29. The method of claim 26, further comprising an act of placing the display controller in a selected operating mode in response to a request by a software application.

30. The method of claim 26, wherein the act of receiving the request to process and output the predetermined quantity of data includes an act of receiving the request from a device external to the graphics processing unit.

31. The method of claim 30, wherein the act of processing and outputting the predetermined quantity of data includes an act of outputting the predetermined quantity of data to the external device.

32. The display controller of claim 26, further comprising an act of receiving a request to process and output the predetermined quantity of data.

* * * * *